United States Patent [19]

Tezuka et al.

[11] 4,399,153
[45] Aug. 16, 1983

[54] COMBINATION OF FROZEN DESSERT AND STICK CHEWING GUM

[75] Inventors: Shichigoro Tezuka, Kawasaki; Yoshinori Sato, Niiza; Masaki Shibata, Tokyo; Nobuyuki Harikae, Funabashi, all of Japan

[73] Assignee: Lotte Co., Ltd., Tokyo, Japan

[21] Appl. No.: 296,903

[22] Filed: Aug. 27, 1981

[51] Int. Cl.$^3$ .......................... A23G 3/30; A23G 9/04; A23G 9/24; A23G 9/26
[52] U.S. Cl. ....................................... 426/5; 426/101; 426/104; 426/134; 426/139
[58] Field of Search .................. 426/5, 101, 104, 134, 426/139, 3

[56] References Cited

U.S. PATENT DOCUMENTS

| | | | |
|---|---|---|---|
| 575,206 | 1/1897 | Britton | 426/5 |
| 1,747,112 | 2/1930 | Good | 426/3 |
| 1,786,606 | 12/1930 | Gordon | 426/101 |
| 2,570,031 | 10/1951 | Gibson | 426/101 |
| 3,062,662 | 11/1962 | McDonald | 426/5 |
| 4,254,148 | 3/1981 | Ogawa et al. | 426/101 |

Primary Examiner—Jeanette M. Hunter

[57] ABSTRACT

A frozen dessert such as ice cream or ices with chewing gum supporting the frozen dessert is provided. The stick chewing gum is prepared using anhydrous glucose as a sweetener without use of sucrose and subjected to two separate aging steps, especially to a second aging at $-10°$ to $-5°$ C.

9 Claims, 2 Drawing Figures

COMBINATION OF FROZEN DESSERT AND STICK CHEWING GUM

BACKGROUND OF THE INVENTION

This invention relates to a frozen dessert with chewing gum, and more particularly to a combination of a frozen dessert and chewing gum stick as the gripping element.

Heretofore, there has been known "ice sticks", "ice cream bars", "pops" comprising an ice candy, a water ice or an ice cream attached to a wood or plastic stick which can be gripped with one hand. In this type of frozen dessert, the wood or plastic stick is disposed of after eating of the dessert, resulting in unfavorable problems in environment and natural reasources.

The inventors have studied to use chewing gum as a stick in lieu of the wood or plastic stick, which is edible after consumption of the dessert itself. However, conventional chewing gum in the form of stick readily bent or breakable and thus presents difficulty in the preparation of the frozen dessert of this stick type.

Now it has been found by the present invention that the chewing gum in the form of stick (hereinafter, referred to stick chewing gum) may be provided having enough strength to endure bending and breaking when used as a gripping bar in frozen dessert. By using anhydrous crystalline glucose in stead of sucrose as a sweetener and reducing water content to about ¼ of the conventional level and by subjecting the chewing gum to two aging steps, especially subjecting the finished stick chewing gum to a second aging under specified conditions, a stick chewing gum can be obtained which resists bending and breaking when frozen or when held in the hand as a gripping element.

SUMMARY OF THE INVENTION

An object of the invention is to provide a frozen dessert with chewing gum of stick- or bar ice cream-type, using chewing gum as a stick instead of a wood or plastic stick.

Another object of the invention is to provide a frozen dessert with chewing gum, using stick chewing gum having enough strength to endure bending or breaking when used as a stick for supporting and gripping.

The above objects of the invention are achieved, in accordance with the present invention, by using 50 to 75 wt. % of anhydrous glucose as a sweetener without use of sucrose and by limiting water content to 0.5 to 2 wt.%. Further, in the process of preparing the stick chewing gum, the finished stick chewing gum is subjected to a first ageing step and thereafter a second aging or storing at −10° to −5° C. for 15 to 24 hours.

DETAILED DESCRIPTION OF THE INVENTION

Figure 1:
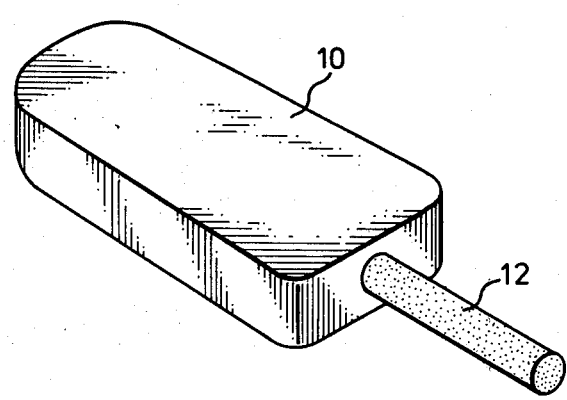
FIG. 1 shows a schematic view of the frozen dessert with chewing gum according to the invention.

Types of anhydrous glucose are commercially available. Among those that may be listed are powdered glucose (DE 92-96) and refined glucose (DE 97-98) purified therefrom as well as crystalline glucose (DE100) and anhydrous crystalline glucose purified therefrom, among which the powdered glucose and refined glucose may produce enough strength when used in the stick chewing gum but are unfavorable in taste. The crystalline glucose is favourable in taste but poor in strength when used in the stick chewing gum. Thus, the anhydrous crystalline glucose is most preferable and is used in an amount of 50 to 70 wt. %, preferably to 60 to 70 wt.% based on the total weight of the stick chewing gum in accordance with the invention. In comparison with the conventional chewing gum using 0 to 50 wt.% of glucose (calculated as anhydrous crystalline glucose), it will be appreciated that a much greater amount of the anhydrous crystalline glucose is used in accordance with the invention. In comparison with the water content of 2 to 5% in the conventional chewing gum, the stick chewing gum according to the invention contains 0.5 to 2 wt.%, preferably 0.8 to 1.5% of water. The lesser amount tends to produce a readily breakable chewing gum stick, while the larger amount tends to produce a readily bendable stick.

In accordance with the invention, other ingredients than the above glucose and water in the stick chewing gum are not critical and may be used as in any conventional formulation.

Examples of formulations of the preferable chewing gum used in the invention and the conventional chewing gum are given in Table 1 below.

TABLE 1

| Formulation | Conventional chewing gum | Chewing gum in the invention |
|---|---|---|
| Gum base | 20–25 wt. % | 20–25 |
| Sucrose | 25–75 | — |
| Anhydrous crystalline glucose | 0–50 | 60–70 |
| Starch hydrolyzate syrup | 6–8 | 2.5–5 |
| Softening agent | 1–2 | 0–0.5 |
| Flavor | 0.6 | 0.6 |
| Water content | 2–5 | 0.8–1.5 |

Usually, a gum base for chewing gum consists of natural and/or synthetic resins occupying 50% or more of the gum base as a chewing material (50 to 70%), waxes for quality improvement (2 to 10%), ester gums for membrane improvement (10 to 20%), fillers for anti-sticking and texture improvement (5 to 15%), optional emulsifiers for quality improvement, and plasticizers. As the natural resins there may be used, for example, chicle and jeltong, while vinyl acetate resin, butyl rubber, polybutene and S.B.R. may be used as the synthetic resins. As the wax, microcrystalline wax is preferably used. As the ester gum, resin glycerine ester is mainly used and a fine powder of calcium carbonate and talc may be used as the fillers. The emulsifier may be optionally selected from nonionic surfactants. Further, the above S.B.R, wax, resin ester and emulsifier may be used as the plasticizers, depending on the type of the natural and/or synthetic resins.

As other ingredients than those listed in Table 1, starch hydrolyzate syrup for improving the sweetening taste may be added and lecithin, glycerine, hydrogenated oil, glycerine-monostearate and other may be used as the softeners. Flavor may be optionally chosen, depending on the flavor type of the frozen dessert. Preferably, the similar type of flavor as in the frozen dessert is used in the stick chewing gum.

Different from the conventional process, the chewing gum of the invention is subjected to two separate aging steps in the preparing process which preferably comprises steps of (mixer)-(extruder)-(roller)-(gage roll)-(1st aging)-(roll cutter)-(packing)-(2nd aging). The gum base is prepared by kneading the above gum base composition in a kneader and the additives other than the gum base as listed in Table 1 are mixed homogeneously in the mixer and the resulting mixture is then kneaded enough in the extruder. The mass is shaped into a plate through the roller and then into a continuous cylindrical strip in the gage roll, which is then subjected to the first aging. The first aging is carried out by storing the strip at the temperature of 18° to 20° C. and at a humidity of 45 to 55% for 15 to 24 hours. The purpose of the first aging is to produce the necessary physical property for cutting the continuous strip properly in the succeeding roll cutter. After the first aging, the continuous cylindrical strip is cut into stick chewing gum pieces, which are then packed in a container. The packed stick chewing gum pieces are then subjected to the second aging which produces the necessary physical property for combining with the frozen dessert. The second aging is carried out at a temperature of $-10°$ to $-5°$ C. for 15 to 24 hours to provide uniform hardness and stickiness for the chewing gum and to produce a consistent material. If the second aging is omitted, the stick chewing gum tends to bend or break in use and to increase the percent of defective sticks caused during manufacture, when the stick chewing gum is drawn out from the storage holder by a mechanical gripper grasping the stick portion for insertion into the frozen ice cream portion of the end product. The second aging step eliminates such trouble.

The frozen dessert to which the stick chewing gum is combined may be of any type, for example ice creams and frozen ices. The ice creams may be classified into ice cream, ice milk and lacto-ice depending on milk fat content, all of which may be used in accordance with the invention. Ice cream contains more than 8% of milk fat, while the ice milk contains 3 to 8% of the same. Lacto-ice has a milk fat content of less than 3.0%. The ices include sherbet (containing a major portion of fruit juice and a minor portion of milk solid), ices (frozen dessert containing no milk solid) and water ice, all of which may be also used in accordance with the invention. Other imitative ice creams containing animal or vegetable oil and fat in stead of milk fat, or those containing protein and casein other than milk protein, such as soya protein and soya casein, may be also included in the list of frozen dessert having utility in the present invention.

Figure 2:
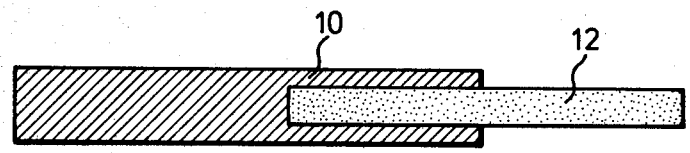
FIG. 2 shows a longitudinal section of the frozen dessert with chewing gum in FIG. 1.

The frozen dessert with chewing gum according to the invention is shown in FIGS. 1 and 2, wherein the frozen dessert 10 and the stick chewing gum 12 inserted thereinto constitute the frozen dessert with chewing gum. The frozen dessert 10 is shaped into a rectangular body in this embodiment but not limited thereto and may be of any shape, such as cylindrical body, geometrical patterns and others. The size of the stick chewing gum 12 is preferably between 8.5 to 9.5 mm in diameter and 85 to 90 mm in length from the view point of human engineering; about a half of which length is preferably inserted into the frozen dessert 10.

The procedure of preparation will be illustrated for an ice cream with stick chewing gum. The frozen ice cream is filled into a given holder by means of a filler apparatus. Then, the stick chewing gum, which has been previously subjected to the 2nd aging, is inserted into the frozen dessert manually or by use of a suitable mechanism, such as a cam pusher, and the combination is thereafter transferred into a curing chamber for cooling and hardening at the temperature below $-18°$ C. After hardening, the holder is warmed in a defrosting step to allow easy removal of the combined ice cream with stick chewing gum from the holder. On this occasion a gripper grasps the chewing gum stick removing the combination from the holder. The removed ice cream with chewing gum is then conveyed by a bucket conveyor to a packing station for producing the end product. The ice confections other than ice cream, such as sherbet, may be produced in the similar manner. With ice candy compositions which have not previously been subjected to a freezing process, the fluid material may be filled in a given receptacle, into which may be immersed the stick chewing gum and then subjected to the freezing process.

The following examples illustrate the embodiments of the invention.

EXAMPLE 1

The following materials were kneaded in the kneader to prepare the gum base.

| | | |
|---|---|---|
| Natural resin | 25 | wt. % |
| Vinyl acetate resin | 25 | |
| Polyisobutene | 12 | |
| Ester gum | 15 | |
| Microcrystalline wax | 8 | |
| Monoglyceride | 3 | |
| Calcium carbonate | 12 | |
| Total | 100 | |

The resulting gum base was mixed homogeneously with the following chewing gum additives in the mixer.

| | | |
|---|---|---|
| Gum base | 25 | wt. % |
| Anhydrous crystalline glucose | 70 | |
| Starch hydrolyzate syrup | 4 | |
| Softening agent (lecithin) | 0.4 | |
| Flavor (strawberry) | 0.6 | |
| Total | 100 | |

The resulting mixture was further kneaded in the extruder and then rolled into a plate shape, which was then converted to the continuous cylindrical strip of 9 mm diameter by means of a gage roll. Thereafter the strip was stored in a first aging chamber at a temperature of 20° C. and the humidity of 45% for 24 hours. After the first aging the continuous strip of chewing gum was cut into stick pieces of 90 mm length with a roll cutter. The pieces were then stored in a second aging chamber at $-10°$ C. for 24 hours to prepare a stick chewing gum for use in the frozen dessert with chewing gum according to the invention.

COMPARATIVE EXAMPLE 1

The stick chewing gum was prepared from a conventional chewing gum formulation. The gum base was prepared from the same formulation as in Example 1 but the following formulation was used for preparing the chewing gum.

| | | |
|---|---|---|
| Gum base | 25 | wt. % |
| Sucrose | 35 | |
| Anhydrous crystalline glucose | 30 | |
| Starch hydrolyzate syrup | 7.4 | |
| Lecithin | 2.0 | |

| -continued | | |
|---|---|---|
| Flavor (strawberry) | | 0.6 |
| | Total | 100 |

The stick chewing gun was prepared in the same way as in Example 1 and formed into the same size pieces (Φ9×90 mm).

EXAMPLE 2

Preparation of ice cream with chewing gum.

A usual ice cream composition having strawberry flavor was filled in 30 rectangular stainless holders of 4.5×2×9 cm size. The thirty holders were divided into three groups of ten each. Into the center of each holder in each group three was inserted a 4.5 cm length of chewing gum sticks; one group with sticks prepared in Example 1 with the second aging, in Example 1 without the second aging step; another group with sticks prepared step and the third group with sticks prepared in comparative Example 1. Then, each holder was placed in a refrigerator at −18° C. for hardening of the contents. After hardening, the holder was immersed into a water bath at 20° C. for 3 minutes and then the ice cream was drawn out from the holder by gripping its chewing gum stick. The resulting ice cream with chewing gum was then placed vertically in a chamber at 25° C. and observed for its appearance after 5 minutes. The result is shown in Table 2.

TABLE 2

Strength test for the stick chewing gum in the frozen dessert

| | Example 1 | | Comparative |
|---|---|---|---|
| | With 2nd aging | Without 2nd aging | Example 1 |
| Bent | 0 | 2 | 10 |
| Broken | 0 | 1 (with crack) | 0 |
| No trouble | 10 | 7 | 0 |

The effect of the invention will be apparent from the above result.

EXAMPLE 3

Preparation of sherbet with chewing gum.

A sherbet composition with chewing gum was prepared in the same way as in Example 2, using orange sherbet in place of the strawberry ice cream as well as the stick chewing gum obtained in Example 1. The ice composition and chewing gum stick was tested by manually holding and eating the same. There was no trouble when the specimen was eaten over the period of 3 minutes at 25° C.

EXAMPLE 4

Preparation of orange ice candy with chewing gum.

Orange juice was poured into a stainless tube (3 cm diameter and 10 cm lone) to the depth of 5 cm. The stick chewing gum obtained in Example 1 was immersed by its half length into the juice and supported against an opening edge of the tube. Then, the tube was immersed in a brine solution at −15° C. freezing the content. Thereafter, the tube was kept at the room temperature for 3 minutes and then the orange ice candy with chewing gum was drawn out from the tube by gripping the chewing gum stick. The chewing gum stick exhibited no trouble when the specimen was eaten at the room temperature over the period of 3 minutes.

It will be appreciated that the strong stick chewing gum which neither bends nor break is obtained for the frozen dessert in accordance with the invention.

What is claimed is:

1. Chewing gum, highly resistant to bending when handled and to breakage when frozen comprising a mixture of 20°-25° wt.% of a conventional gum base, 50-70% of a sweetener consisting solely of anhydrous glucose, 0.5-2 wt.% of water and the remainder an additive such as starch hydrolyzate syrup, a softening agent and flavoring, said mixture being subjected to a first aging at 18° to 20° C., at a humidity of 45-55% for 15 to 24 hours and to a second aging at −10° to −5° C. for 15 to 24 hours.

2. The chewing gum according to claim 1, wherein said anhydrous glucose is anhydrous crystalline glucose.

3. The chewing gum according to claim 1 or 2, wherein the stick chewing gum comprises 20 to 25 wt.% of gum base, 60 to 70 wt.% of anhydrous crystalline glucose, 2.5 to 5 wt.% of starch hydrolyzate syrup, 0 to 0.5 wt.% of softening agent, 0.6 wt.% of flavor and 0.8 to 1.5 wt.% of water.

4. A frozen confection comprising a block of ice cream, ice dessert, ices or the like and stick inserted therein for handling said confection, said stick comprising a chewing gum composition comprising a mixture of 20-25 wt.% of a conventional gum base, 50-70 wt.% of anhydrous glucose, 0.5-2 wt.% of water, and the remainder an additive such as starch hydrolyzate syrup, softening agent and flavoring, said mixture being subjected to a first aging at 18° to 20° C. at a humidity of 45-55% for 15-24 hours and to a second aging at −10° to −5° C. for 15 to 24 hours.

5. The frozen confection according to claim 4 wherein said anhydrous glucose is anhydrous crystalline glucose.

6. The frozen confections according to claim 4 or 5 wherein the chewing gum according to claim 1 or 2 wherein the stick chewing gum comprises 20 to 25 wt.% of gum base, 60 to 70 wt.% of anhydrous crystalline glucose, 2.5 to 5 wt.% of starch hydrolyzate syrup, 0 to 0.5 wt.% of softening agent, 0.6 wt.% of flavor and 0.8 to 1.5 wt.% of water.

7. The frozen confection according to claim 6 wherein said chewing gum is roll cut and packed after said first aging and before said second aging.

8. A method of manufacturing a chewing gum highly resistant to bending in handling and to breakage when frozen comprising the steps of mixing 20-25 wt.% of a conventional gum base, 50-70 wt.% of anhydrous glucose, 0.5-2 wt.% of water and the remainder an additive such as starch hydrolyzate syrup, a softening agent and flavoring said mixture being thereafter extended, rolled, gage rolled and subjected to a first aging step at 18° to 20° C. at a humidity of 45-55% for 15-24 hours, and subsequently to rolling, cutting, packaging, and a second aging step at −10°−−5° C. for 15 to 24 hours.

9. A method of manufacturing a frozen confection, comprising the step of filling a holder with a mixture of a dessert such as ice cream, ices, ice desert, insert a stick comprising the chewing gum of claim 1, freezing and hardening said dessert and thereafter removing said holder.

* * * * *